(12) United States Patent
Runzo

(10) Patent No.: US 7,395,548 B2
(45) Date of Patent: Jul. 1, 2008

(54) SYSTEM AND METHOD FOR SIGNAL VALIDATION AND LEAKAGE DETECTION

(75) Inventor: Joseph Donald Runzo, McGaheysville, VA (US)

(73) Assignee: Comsonics, Inc., Harrisonburg, VA (US)

( * ) Notice: Subject to any disclaimer, the term of this patent is extended or adjusted under 35 U.S.C. 154(b) by 1669 days.

(21) Appl. No.: 09/915,966

(22) Filed: Jul. 26, 2001

(65) Prior Publication Data

US 2003/0022645 A1    Jan. 30, 2003

(51) Int. Cl.
  *H04N 7/173* (2006.01)
  *H04B 17/00* (2006.01)
  *H04B 1/00* (2006.01)
(52) U.S. Cl. ............. 725/107; 725/124; 455/67.13; 455/226.2; 455/63.1; 455/226.4
(58) Field of Classification Search ........... 725/143, 725/107, 124, 125, 150; 455/67.13, 226.2, 455/226.4, 63.1
See application file for complete search history.

(56) References Cited

U.S. PATENT DOCUMENTS

| | | | | |
|---|---|---|---|---|
| 3,895,368 A * | 7/1975 | Gordon et al. | ........... | 340/572.4 |
| 4,072,899 A | 2/1978 | Shimp | ........... | 325/67 |
| 4,491,968 A * | 1/1985 | Shimp et al. | ........... | 455/67.7 |
| 4,520,508 A * | 5/1985 | Reichert, Jr. | ........... | 725/125 |
| 5,073,822 A | 12/1991 | Gumm et al. | ........... | 358/139 |
| 5,294,937 A | 3/1994 | Ostteen et al. | ........... | 342/459 |
| 5,493,210 A | 2/1996 | Orndorff et al. | ........... | 324/95 |
| 5,608,428 A | 3/1997 | Bush | ........... | 348/6 |
| 5,633,582 A | 5/1997 | Orndorff et al. | ........... | 324/95 |
| 5,777,662 A | 7/1998 | Zimmerman | ........... | 348/6 |
| 5,939,887 A | 8/1999 | Schmidt et al. | | |
| 5,982,165 A | 11/1999 | Bowyer et al. | ........... | 324/95 |
| 6,005,518 A | 12/1999 | Kallina | ........... | 342/459 |
| 6,018,358 A | 1/2000 | Bush | ........... | 348/6 |
| 6,049,693 A * | 4/2000 | Baran et al. | ........... | 725/124 |
| 2003/0206559 A1* | 11/2003 | Trachewsky et al. | ........... | 370/509 |
| 2005/0220180 A1* | 10/2005 | Barlev et al. | ........... | 375/222 |

\* cited by examiner

*Primary Examiner*—Hoang-Vu A Nguyen-Ba
(74) *Attorney, Agent, or Firm*—Whitham, Curtis, Christofferson & Cook, PC

(57) ABSTRACT

A system and method of validating signals and detecting signal leakage in a cable communications includes the steps of a) tuning a radio frequency receiver to a carrier frequency of a selected RF channel, b) measuring a signal level of the carrier frequency, c) off-tuning the receiver by a predetermined offset, d) measuring a signal level of the off-tuned carrier frequency, e) obtaining a signal level difference between the signal level of the carrier frequency and the signal level of the off-tuned carrier frequency to determine if interference exists, f) declaring an interference condition if the signal level difference is less than a predetermined difference amount, and g) providing an indication of the signal level of the carrier frequency to permit a determination of whether a signal leakage condition exists.

35 Claims, 4 Drawing Sheets

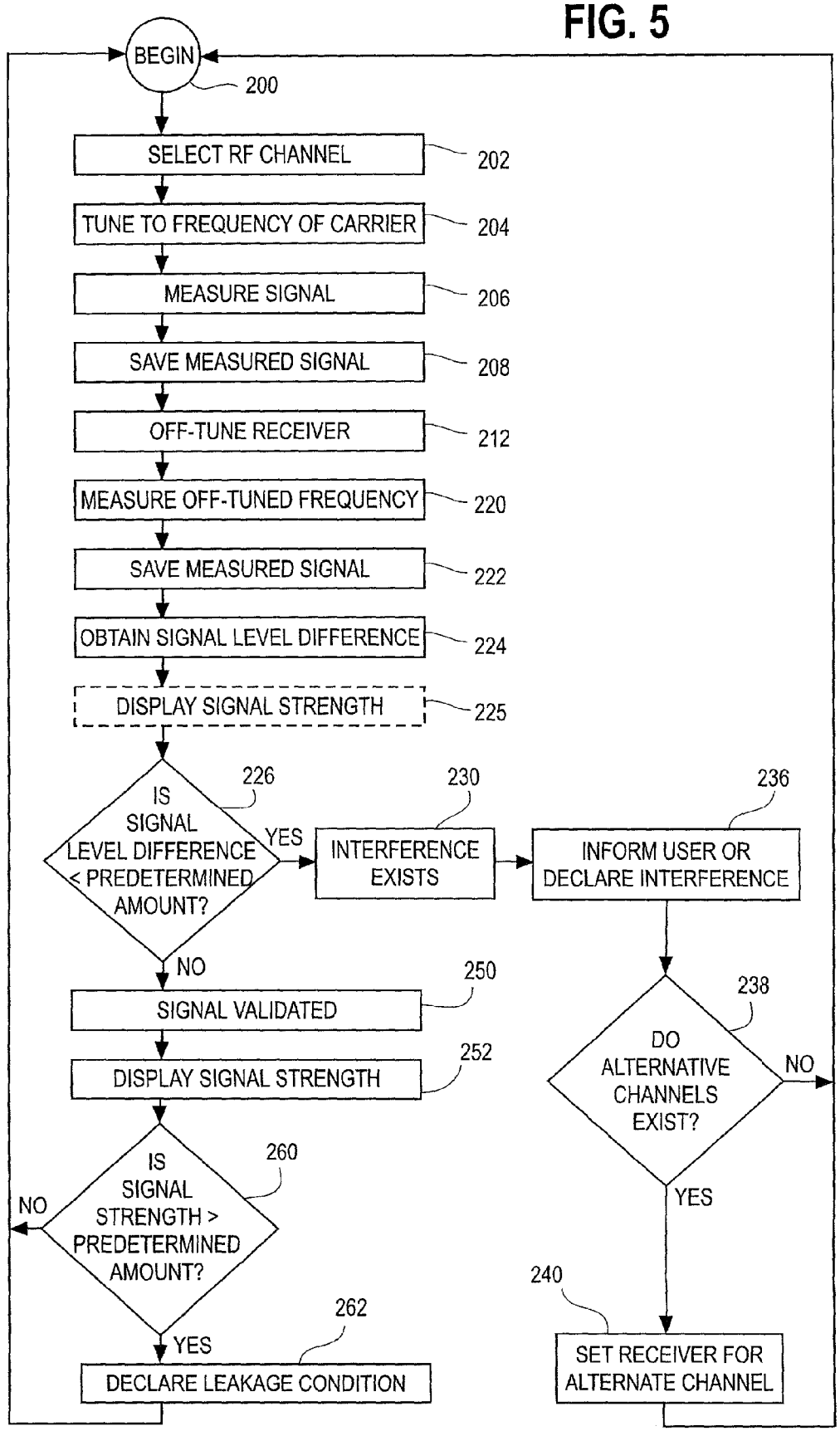

SYSTEM AND METHOD FOR SIGNAL VALIDATION AND LEAKAGE DETECTION

BACKGROUND OF THE INVENTION

FIELD OF THE INVENTION

The present invention relates generally to a system and method for detecting RF (Radio Frequency) leakage in a cable television or CATV system, and more specifically to a system and method for signal validation and leakage detection (RF egress) using an existing RF channel without disruption of the channel subscriber service or channel programming.

Cable television is a system for delivering television signals to subscribers or viewers by means of coaxial cable. Additionally, fiber optic cable and microwave links may be used. For a monthly fee, cable television viewers receive a clear picture of local channels, as well as reception of many additional channels, including many channels devoted to movies, sports, news or special events. Originating in 1949 as a way of providing good signal reception to geographic areas where the conventional television signals were weak, cable spread quickly among rural municipalities, and can now be found servicing a majority of the television viewers in the United States.

In the 1980's conflict arose between cable television operators and the aviation industry because the frequencies used by the cable television operators to carry television signals shares frequency allocations with frequencies used by the aviation industry, such as air traffic controller and aircraft communication channels. Conventional coaxial cable distribution systems use the 50 MHz to 1 GHz spectrum. When signals of sufficient strength leaked or egressed from a cable plant into the atmosphere, they interfered with those used by the aviation industry for communication and navigation, thus potentially adversely affecting such communications. Accordingly, it is extremely important that the signals used in the downstream portion of the coaxial plant or system do not egress or leak from the coaxial cable plant and propagate into the terrestrial environment.

In particular, air traffic control and aircraft communications, which are contained within the 108 MHz to 137 MHz and the 225 MHz to 400 MHz range, may be adversely affected by RF egress. Often, when RF egress occurs at multiple locations in a given area, the effects tend to be multiplicative. This may cause interference with critical air traffic communications. Moreover, such adverse effects may occur at surprisingly and unexpectedly high altitudes due to the radiation patterns and other electromagnetic characteristics of RF egress, the details of which are beyond the scope of this disclosure.

Signal leakage can occur in a variety of situations, such as when the shielding of cable cracks or becomes weathered, when connectors become loose, when the cable breaks or when improper or unauthorized connection to the cable system are made. Accordingly, the Federal Communications Commission (FCC) requires these frequencies to be monitored for signal egress on a regular basis.

Mobile RF leakage detectors have been used to comply with FCC regulations. One example is disclosed in U.S. Pat. No. 4,072,899 to Richard L. Shimp, and assigned to the assignee of this invention. The Shimp RF leakage detector detects RF leakage by inserting a unique signal at the headend of the coaxial plant. Using a narrow band receiver, the device detects the unique signal, which indicates RF egress at the location where the measurement takes place. However, this system requires the transmission of a test signal on an RF channel, which precludes use of that channel during testing.

Another known ingress/egress system is U.S. Pat. No. 5,777,662 to Dennis A. Zimmerman, and assigned to the assignee of this invention. This system transmits a signal encoded with global positioning system (GPS) data. If a cable fault exists, the transmitted signal is propagated from the cable fault to the headend via ingress, and the GPS data is decoded to determine the location of the cable fault. Egress is also detected by a receiver tuned to a specific frequency. However, the receiver may make erroneous measurements if noise exists of sufficient amplitude in the measured frequency range.

Another known mobile RF leakage detector is disclosed in U.S. Pat. No. 5,294,937 to Ostteen et al. This RF leakage detector combines a GPS system and a computer control unit to measure RF signal strength, while tracking the corrected distance between the mobile test vehicle and the source of the egress. This data is stored for later analysis.

In earlier known RF leakage detectors, the leakage test carrier was independent from normal television carriage. Typically, a unique and audible coding was modulated onto the carrier to assist the operator in determining if the detected signal was truly signal leakage from the system under test. The leakage detector would typically tune to an independent or unused test carrier center frequency, and detect the test signal modulated onto the carrier. A demodulated audio signal would then be passed directly to a speaker, where the user simply listens to the actual test signal for a positive confirmation that a leak exists. Because the modulated signal is detectable far into the receiver's normal near-zero-signal noise floor, hearing the unique audible tone positively confirms that the intercepted leakage or egress represents signal leakage from the cable plant under test.

However, the increased demand for a greater number of channels, in both basic cable and premium channel services, and the advent of digital transmission, have highlighted the drawbacks of known RF leakage detectors for coaxial cable plants using a dedicated channel. The current demand for a greater number of channels places a premium on the bandwidth requirements of the cable system. This renders use of a dedicated channel for transmission of a unique test signal impractical and uneconomical.

Additionally, known leakage detectors may be susceptible to taking erroneous measurements or indicating "false positive" test results if electromagnetic noise or interference (EMI) exists having sufficient signal strength in the measured frequency range. Such electromagnetic noise may be introduced into the environment by various electronic devices. Residential environments, for example, have many sources electromagnetic noise, such as motors in washing machines, refrigerators, power tools, hair dryers, fans and the like. Further, computers and other electronic equipment generate high frequency noise.

Accordingly, a need exists for an RF leakage detector that does not require use of a dedicated test channel with test data injected or encoded therein, and which does not interfere with subscriber programming. Additionally, a need exists for an RF leakage detector that is not susceptible to false readings in the presence of electromagnetic noise.

SUMMARY OF THE INVENTION

The disadvantages of present signal leakage detectors are substantially overcome with the present invention by providing a novel system and method for signal validation and leakage detection. The present inventive system and method does not encode or inject any test signals into the CATV programming. Accordingly, the subscriber service is not interrupted or degraded in any way. Existing "in use" channels are used to measure the RF carrier signal, which may be leaking from a defective cable or connector. Further, the signal is validated to be sure that the RF receiver is truly receiving RF egress corresponding to the measured RF carrier. Validation permits the user to distinguish between a true RF egress signal and potential noise or electromagnetic interference not related to the CATV plant.

Off-tuning from the center frequency of a measured RF carrier by a little as 5 or 10 kHz provides reliable data with respect to the signal level. In particular, once off-tuned, a measured RF signal should be lower in amplitude by a significant amount. If the measured signal level of the off-tuned carrier is not reduced by at least 3 dB from the measured level of the carrier frequency, it is presumed that noise exists in that region and measurements in that frequency region are unreliable. Alternate carrier frequencies may be measured, or the leakage testing may be aborted to avoid "false-positive" test results.

More specifically, one embodiment of the present inventive method includes the steps of a) tuning a radio frequency receiver to a carrier frequency of a selected RF channel, b) measuring a signal level of the carrier frequency, c) off-tuning the receiver by a predetermined offset, d) measuring a signal level of the off-tuned carrier frequency, e) obtaining a signal level difference between the signal level of the carrier frequency and the signal level of the off-tuned carrier frequency to determine if interference exists, f) declaring an interference condition if the signal level difference is less than a predetermined difference amount, and g) providing an indication of the signal level of the carrier frequency to permit a determination of whether a signal leakage condition exists.

According to another embodiment, the steps of measuring are performed by receiving signals corresponding to an existing RF carrier frequency that leak from the coaxial cable communications system. In an alternate embodiment, the steps of measuring are preformed passively with no encoding or injecting of test signals into the selected channel or by modifying the channel programming of the selected channel.

According to still another embodiment, the carrier frequency of the selected RF channel is between 108 MHz and 400 MHz wherein that frequency range corresponds to the frequency spectrum designated for use by aircraft communication and aircraft control.

In yet another embodiment, the receiver is off-tuned by between 5 kHz and 100 kHz from a center frequency of the carrier. In a further embodiment, the receiver is off-tuned by between 100 kHz and 1 MHz from the center frequency of the carrier. The receiver may be off-tuned to a frequency above or below the center frequency of the carrier.

In a further embodiment, either the measured signal level of the carrier frequency or the measured signal level of the off-tuned carrier frequency is saved to facilitate obtaining the signal level difference. An interference condition is declared if the signal level difference is less than about 3 dB.

In another embodiment, the measured signal is validated if an interference condition has not been detected and the signal level difference is not less than the predetermined difference amount.

In yet another embodiment, if an interference condition has not been declared, a signal leakage condition is declared if the signal level of the carrier frequency is greater than a predetermined leakage amount.

In still another embodiment, an indication of the signal level of the carrier frequency is periodically updated in real time so that a signal leakage condition can be determined. A signal leakage condition is determined to exist if the measured signal level of the carrier frequency is greater than the equivalent of 20 microvolts per meter measured at three meters.

According to another embodiment, if the interference condition is detected, an alternate RF channel is chosen having a predetermined RF frequency spacing from the selected channel.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

FIG. 5 is a flowchart of a specific embodiment of the present invention.

DETAILED DESCRIPTION OF THE INVENTION

In this written description, the use of the disjunctive is intended to include the conjunctive. The use of definite or indefinite articles is not intended to indicate cardinality. In particular, a reference to "the" object or thing or "an" object or "a" thing is intended to also describe a plurality of such objects or things.

It is to be further understood that the title of this section of the specification, namely, "Detailed Description of the Invention" relates to Rules of the U.S. Patent and Trademark Office, and is not intended to, does not imply, nor should be inferred to limit the subject matter disclosed herein or the scope of the invention.

Figure 1:
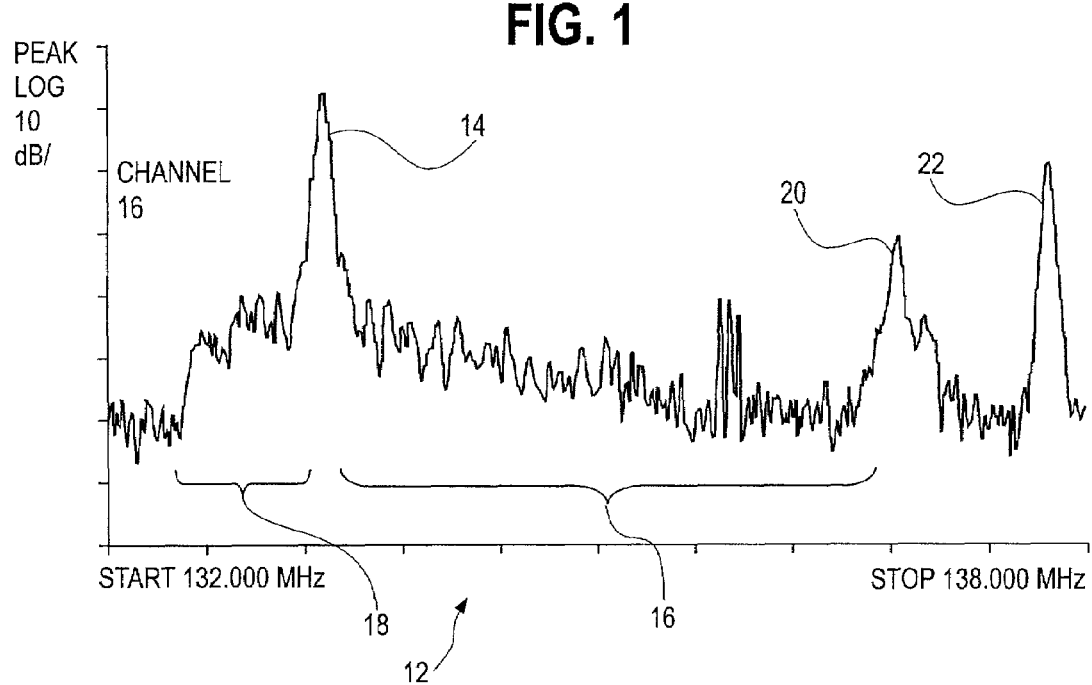
FIG. 1 is a waveform of a known television signal.

Referring now to FIG. 1, a typical CATV channel waveform 12 is shown on the screen of a spectrum analyzer, in accordance with NTSC standards. The waveform 12 shows a picture carrier 14, upper side bands 16, lower sidebands 18, a color subcarrier 20 and a sound carrier 22. In the illustrated embodiment, the waveform 12 corresponding to channel 16 is shown with a span of 6 MHz.

Figure 2:
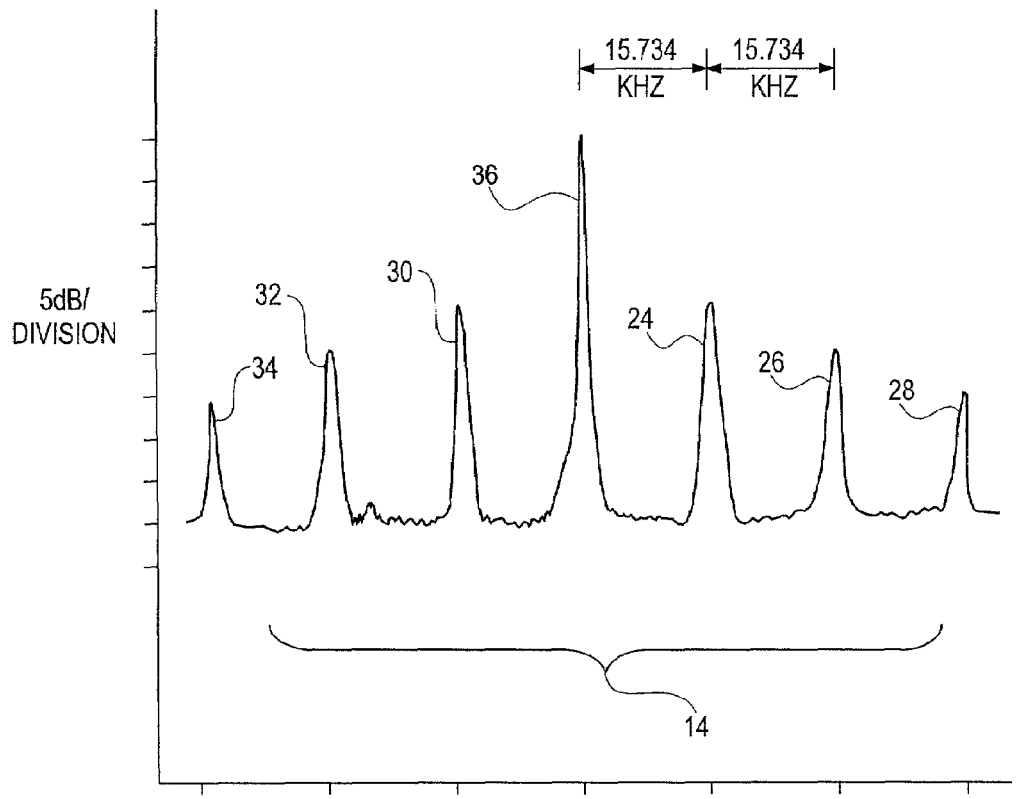
FIG. 2 is an expanded view of the waveform of FIG. 1.

As shown in FIG. 2, the picture carrier 14 is expanded to show first 24, second 26, and third 28 upper side bands and first 30, second 32, and third 34 lower side bands in greater detail. Typically, the first side band 24, 30, which is located 15.734 kHz from the center frequency 36 of the picture carrier 14, is about 20 dB lower in amplitude from the peak signal level of the picture carrier or channel carrier. Successive side bands are typically 4 dB lower in amplitude than adjacent side bands.

Measuring RF signal leakage or egress for compliance with FCC regulations can be difficult in the presence of electromagnetic interference. The present inventive system and method performs egress measurement by receiving signals corresponding to the existing subscriber programming signals or RF carrier frequencies carried via the coaxial cable in the CATV system. The egress measurement process does not interrupt subscriber service because no test signals are injected into the CATV channels, and no test data is encoded and carried from the headend throughout the system. The present inventive process is passive in nature.

Figure 3:
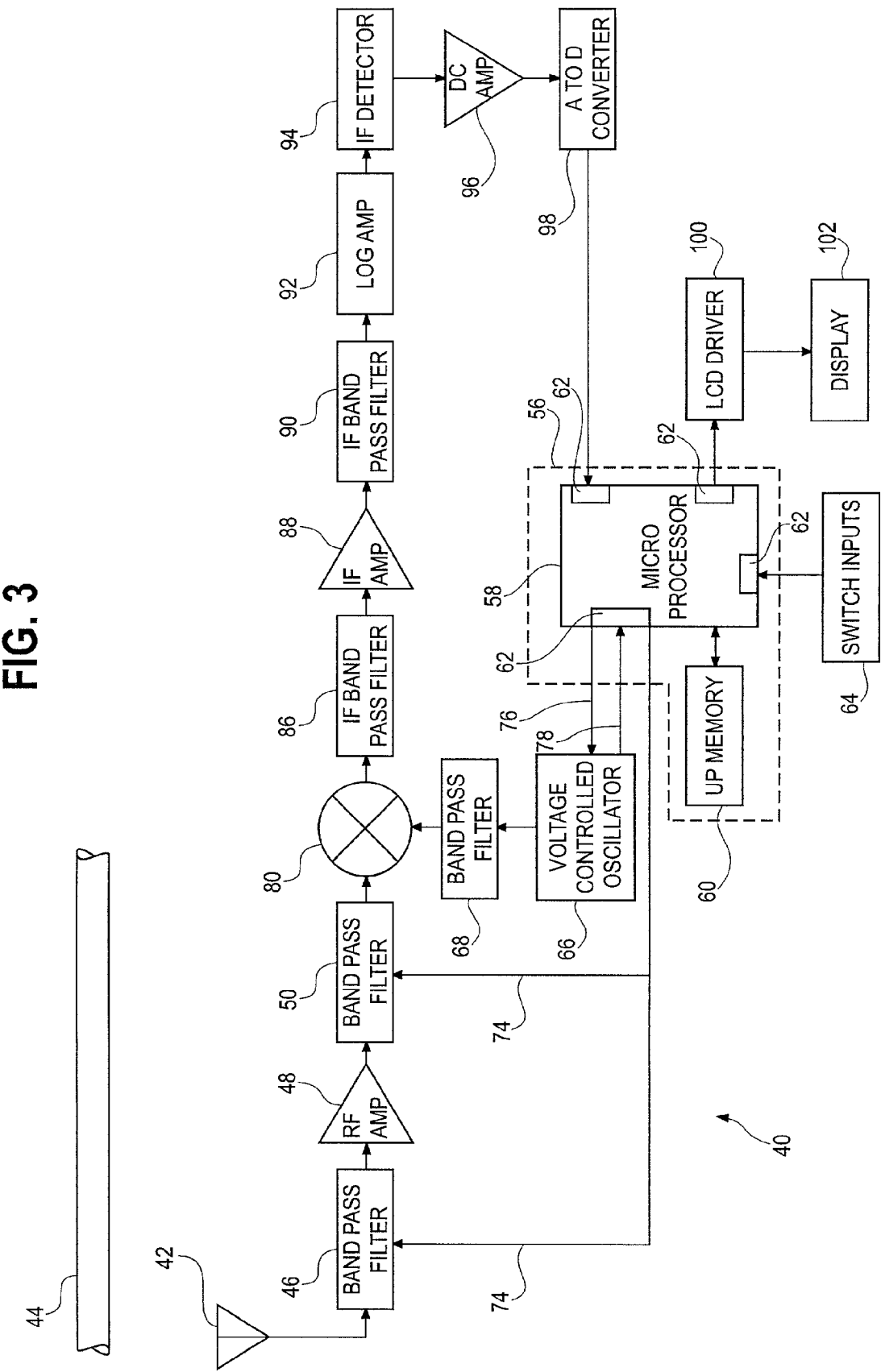
FIG. 3 is a block diagram of a specific embodiment of the present invention.

Referring now to FIG. 3, a block diagram of an RF receiver 40 is shown. The RF receiver 40 may be a dedicated receiver, or it may be a spectrum analyzer or CATV sampling spectrum analyzer. Any suitable narrow band RF receiver or spectrum analyzer may be used to perform the inventive method, provided that the receiver is highly selective, and preferably has a selectivity of about 7.5 kHz. For example, the present method may be performed using the portable sampling spectrum analyzer disclosed in U.S. Pat. No. 4,685,065, Ser. No. 737,217 filed May 23, 1985 and assigned to the owner of the present system and method (this may require modifications to increase selectivity to about 7.5 kHz). Accordingly, the complete disclosure of U.S. Pat. No. 4,685,065 is fully incorporated by reference herein. Alternatively, the following RF receiving devices may be used to perform the present inventive method: the WINDOW family of CATV analyzers with attached SNIFFERLITE module (No. 100395-001) or attached SNIFFERLITE AGILE MODULE (No. 100395-006), the SNIFFER SLEUTH Detector (Nos. 100760-002 and 100760-001), and the SNIFFER SHADOW (No. 101213-001), all of which are commercially available from Comsonics, Inc., of Harrisonburg, Va., the assignee of the present invention.

As shown in FIG. 3, an antenna 42 is provided to receive the RF signals radiated by the coaxial cable 44. The antenna 42 is preferably a directional antenna. The antenna 42 is coupled to a first tunable or tracking band pass filter 46, the selectivity of which corresponds to the frequency spectrum of interest, which is preferably 108 MHz to 150 MHz. The output of the first band pass filter 46 is then routed to an RF amplifier 48, the output of which is then routed to a second tunable or tracking band pass filter 50. The second band pass filter 50 reduces or eliminates signal distortions that may be caused by the RF amplifier 48.

A computer or processor system 56 is included to control the RF receiver 40, and is shown in dashed lines. The computer system 56 preferably includes a microprocessor 58 or a single chip microprocessor having incorporated therein memory 60 (RAM for data storage and ROM for program storage), input/output ports 62, timing circuitry (not shown) and the like. However, any suitable microprocessor, computer, processor and the like may be used, as is known by one skilled in the art. Multiple components, however, may also be used to construct the microprocessor or computer portion 56 of the RF receiver 40. The computer 56 may utilize any suitable computer, processor, central processing unit, microprocessor, RISC (reduced instruction set computer), single chip computer, controller, micro-controller or discrete logic device, as is known to one skilled in the art.

The microprocessor 58 receives input from a variety of switches 64. The switches 64 (data entry keys or numeric key or keypads) may be included to permit the user to enter numbers or commands into the microprocessor 58. In one specific embodiment, the user may enter data, such as the distance between the RF receiver 40 and the source of suspected RF egress, as described in greater detail hereinafter. Various alarms may also be reset by depression of the appropriate switch 64.

The microprocessor 58 is coupled to a voltage controlled oscillator (VCO) 66, which is in turn connected to a third band pass filter 68, which need not be a tunable band pass filter. Note that the first and second band pass filters 46, 50 may be controlled by signals 74 from the microprocessor 58. The microprocessor 58 controls tuning of the VCO 66 via control lines 76, and additionally, the VCO provides data back to the microprocessor via status lines 78 so that exact tuning of the VCO is accomplished.

A mixer 80 is provided to perform the tuning function. The mixer 80 receives its first input from the output of the second band pass filter 50, and receives its second input from the output of the third band pass filter 68. Only a single mixer is needed, rather than two mixers, because preferably, the IF frequency used is a relatively high frequency, around 45 MHz, and the spectrum of interest is relatively narrow.

The output of the mixer 80 is then routed to a first IF (intermediate frequency) band pass filter 86 to eliminate all but the IF signal of interest. The IF signal is then amplified by an IF amplifier 88. The output of the IF amplifier 88 is then coupled to a second IF band pass filter 90 to eliminate any amplifier induced distortion and to improve the selectivity of the receiver 40. The output of the second IF band pass filter 90 is then coupled to the input of a log amplifier 92. The log amplifier 92 permits a wide range of signal levels to be measured without requiring numerous attenuators and gain switching devices to break up or "divide" the input signal into appropriate amplitude ranges. The log amplifier 92 essentially compresses the range of the large signals without significantly affecting the range of the small signals. This permits relatively high sensitivity for weak signals.

The output of the log amplifier 92 is then routed to an IF detector 94 to measure the peak signal level of the measured RF signal. The output of the detector 94 is then amplified by a DC amplifier 96, and the signal is converted from an analog signal to a digital signal by an A/D converter 98. The A/D converter 98 is preferably an eight bit or ten bit converter 98. Data from the A/D converter 98 is received by the microprocessor 58, and is processed to provide a signal level measurement. The microprocessor 58 provides output data to an LCD driver 100, which in turn, controls an LCD display 102. The LCD display provides an indication of measured signal level, as well as other information as described below.

As can be understood by one skilled in the art, the RF receiver 40 of FIG. 3 may be constructed using few components. Because the RF receiver 40 is preferably dedicated to performing specific RF measurements in the above-described spectrum of interest, its complexity is much lower relative to general purpose signal level measuring devices. It is therefore contemplated that the RF receiver 40 may be hand-held, and may be of similar dimension and weight as a commercially available pager. In such a device, a battery (not shown) would provide electrical power. Alternatively, the present inventive method described below may be incorporated into a more complex device, such as the spectrum analyzer described above with respect to U.S. Pat. No. 4,685,065. However, any suitable narrow band RF receiver may be used to implement the present inventive method.

Referring now to FIGS. 4A-4E, various display presentations are shown on the LCD display 102. Preferably, an LCD display 102 (FIG. 3) is used due to its low power consumption and readability. In the illustrated embodiment, the LCD display 102 shows an indication of measured signal strength 110, units of measurement 112, remaining battery power 114, whether noise or interference is detected 116, whether leakage is detected 118, and an indication of measured signal level 120. Any suitable display, however, may be used, such as an appropriately dimensioned CRT display, LCD display, electro-luminescent display, plasma display, LED display and the like.

Referring back to FIG. 3 according to one specific embodiment, the RF receiver 40 is tuned to the carrier frequency of a selected channel. Note that generally, the RF receiver 40 is preferably tuned to the video carrier rather than to the sound carrier due to its greater signal strength. The present method is based upon the detection of egress or signal leakage of existing RF carriers in the CATV system, therefore the RF receiver may be tuned to any active RF channel in the CATV system. Note that the RF receiver 40 is not directly coupled to the coaxial cable 44 in any way. Rather, RF signals that egress from the coaxial cable 44 or connectors are received by the antenna 42 of the RF receiver 40. Essentially, any RF signals leaking from a defect or break in the coaxial cable 44 radiate outward from the cable as if being transmitted by an antenna, although the strength of the radiated signal or egress is dependent upon the nature of the defect or break in the cable or connectors and the RF frequency of the emissions.

Although the RF receiver 40 may be tuned to any active CATV channel, preferably, the RF receiver is tuned to a video carrier frequency within the frequency spectrum designated for use by aircraft communication and aircraft control. This is because the FAA is particularly concerned with interference cause by CATV systems in this frequency region and therefore mandates testing within this frequency band. For example, the RF receiver 40 may be tuned to frequencies between 108 MHz and 400 MHz. This range of frequencies may be further divided into two frequency regions, namely 108 MHz to 137 MHz and 225 MHz to 400 MHz.

If the RF leakage or egress is of sufficient strength, the RF receiver 40 will receive the signal. However, as described above, one drawback of known systems and methods for egress detection is that such systems and methods can be "fooled" in the presence of noise or electromagnetic interference. If such noise is present in the frequency region of the RF carrier signal being measured, known methods may provide a false positive indication because the noise may be mistaken for the signal of interest.

Referring now to FIG. 5, a specific embodiment of a flowchart of the present method is shown. As shown in a step 200, the method begins, and an RF channel is selected, as shown in a step 202. The narrow band receiver then tunes to the center carrier frequency of the selected RF channel, as shown in a step 204, and the signal level of the carrier frequency is measured, as indicated in a step 206. As shown in a step 208, the measured signal level of the carrier frequency is then saved in the memory.

Next, as shown in a step 212, the receiver is then off-tuned by an amount or offset, preferably between 5 kHz to 100 kHz from the center frequency of the selected channel. Alternately, the receiver may be off-tuned by an amount between 5 kHz to 1 MHz from the center frequency of the selected channel. The receiver may be off-tuned either above or below the center frequency of the selected channel. The signal level of the off-tuned carrier frequency is then measured, as shown in a step 220, and saved in the memory, as illustrated in a step 222. Next, as shown in a step 224, the measured signal level of the off-tuned carrier is subtracted from the measured signal level of the carrier frequency to obtain a signal level difference.

Note that the steps of saving both the measured signals level of the carrier frequency and the measured signal level of the off-tuned carrier frequency are not required to obtain the signal level difference value. For example, one of the values may be saved and the other value may be measured to obtain the signal level difference value. In an alternate embodiment, two receivers may be included in the RF receiver where one receiver measures the signal strength of the carrier frequency while the other measures the signal strength of the off-tuned carrier frequency. The measurements may be performed in real-time so as to obviate the steps of storing the values in specific memory locations. Additionally, the absolute order of the steps in not important. For example, it is equivalent to first measure the signal level of the off-tuned carrier frequency before measuring the signal level of the carrier frequency without departing from the scope and spirit of the present inventive method. Next, as shown in a step 225, the signal strength is shown. Displaying the signal strength is optional at this point within the program, and is shown again in a step 252 below. This is because that in some embodiments, the operator of the device would find it useful to know the value of measured signal strength regardless of whether or not inference exists.

After the signal level difference has been obtained, it is compared to a predetermined minimum difference value, as shown in a step 226. An interference condition is declared if the signal level difference is less than 3 dB, as shown in a step 230. This means that the signal level of the off-tuned carrier frequency is within about 3 dB of the signal level of the carrier frequency. According to the waveform shown in FIG. 2, however, the signal strength of the carrier frequency measured at an "offset" frequency of about 5 kHz to 100 kHz away from the center frequency should be significantly reduced from the peak value. Specifically, the first side band should be about 20 dB lower in amplitude than the signal level of the center frequency. Even moving away or off-tuning from the center frequency of the RF carrier by as little as 5 kHz should yield a significant reduction in signal level, which is a premise of the present inventive method. If the measured value of the off-tuned carrier frequency is not significantly lower than the measured value of the center frequency of the carrier by at least the amount specified by the minimum difference value of about 3 dB, it is assumed that some form of noise or electromagnetic interference exists in the vicinity of the selected carrier frequency. Conversely, it is assumed that if the signal strength of the off-tuned frequency is lower than the signal strength of the center frequency of the carrier by an amount that exceeds the minimum difference value, that interfering noise does not exist within the frequency range of interest. Accordingly, if the minimum difference value is not exceeded, the measurement is deemed to be validated, and the measured signal strength of the carrier represents egress or RE leakage in the vicinity where the signal is being measured.

If the interference condition is detected, the noise presumably causing the interference condition is typically wide band in nature. Electrical noise generated in the environments in which CATV testing is conducted, such as noise generated by motors and other electrical equipment, is known to be wide band, typically spanning several megahertz. Of course, this is only a well-recognized presumption in a real-world environment, and nothing precludes an anomaly where narrow band noise happens to be generated.

Referring back to the flowchart of FIG. 5, the interference condition was declared, as shown in the step 230 if the signal level difference is less than about 3 dB. In an alternate embodiment, this value may modified to be, for example, about 6 dB. Any suitable signal level difference may be used. In the context of the above discussion regarding electromagnetic noise, it is assumed that if the receiver measures a signal that is relatively strong at the frequency off-tuned from the center frequency of the carrier, then the receiver is measuring a noise signal. As described above, the signal strength of the off-tuned carrier should be significantly lower than the signal strength of the center frequency of the carrier.

If this is not the case, then the measured signal level of both the center frequency of the carrier and the off-tuned frequency of the carrier are assumed to be noise signals, and the measurements are ignored, and the interference condition declared, as shown in the step 230. Note that as described above, the system is preferably not a "go-no-go" system. Rather, the signal strength is preferably displayed regardless of whether interference is declared or not. The user may be informed of the interference condition in many different ways, as shown in a step 236. For example, the RF receiver may provide an audio signal, such as an audible alarm, a visual signal, such as a warning light or flashing indicator. Further, the LCD display 102 (FIGS. 4A-4E) may provide graphic, character or numeric representation 116 (FIGS. 4A, 4D) or cause the display flash, as is known in the art. The RF receiver may provide any suitable form of indication to the user to inform the user that an interference condition or noise exists. Alternatively, the user may be apprised of the interference condition via failure of the RF receiver to provide or register any indication of measured signal strength, because an accurate reading cannot be taken in the presence of the noise. Accordingly, failure to display the measured signal strength would also inform the user that the interference condition exists.

Next, as shown in a step 238, if the interference condition was detected, the program optionally checks to determine if a different or alternate RF carrier should be selected, as shown in a step 238. If alternate channels are to be tested, as shown in the "yes" branch of the step 238, the alternate channel is set, as shown in a step 240, and control passes back to the step 200 to begin the process. Measurement of an RF carrier removed by, for example, between 6 to 8 MHz (consistent with the channel allocations), may permit a valid measurement if no noise exists in that region. Such alternate carrier frequencies may be stored in a table in the memory or may be calculated knowing the carrier frequency spacing in the spectrum of interest. Of course, the carrier frequency spacing is dependent upon the CATV system in use and the particular country in which the CATV system exists. If no alternate channels are to be tested, as shown in a "no" branch of the step 238, control passes to the step 200 to continue processing in a continuous loop without modification of the tuning of the carrier frequency. Steps 238 and 240 are optional and are preferably not performed because, noise, if present, typically spans a frequency region so wide so as to preclude all frequency measurements in the spectrum of interest.

Next, as shown in a step 250, the signal is validated if the interference condition was not declared. This means that the RF receiver properly received a signal when tuned to the center frequency of the carrier and did not receive a signal (or received a signal of sufficiently low strength) when off-tuned from that carrier. Accordingly, it is assumed that noise does not exist in the frequency region of interest. Signal validation is important because it assists the user or technician performing the tests. Signal validation eliminates "false positive" indications where the technician could mistake noise signals for RF leakage or egress signals, as occurs with known devices. The measured signal level 120 (FIGS. 4B, 4C, 4E) of the center frequency of the carrier is then displayed on the LCD display, as shown in a step 252.

Figure 4A:
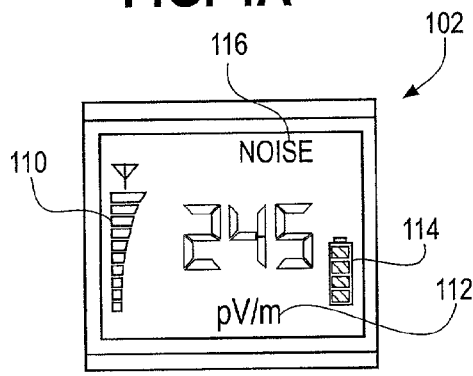
FIGS. 4A-4E are pictorial representations of display presentations.
Figure 4B:
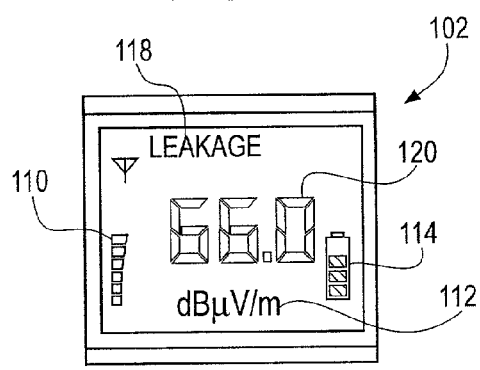
Figure 4C:
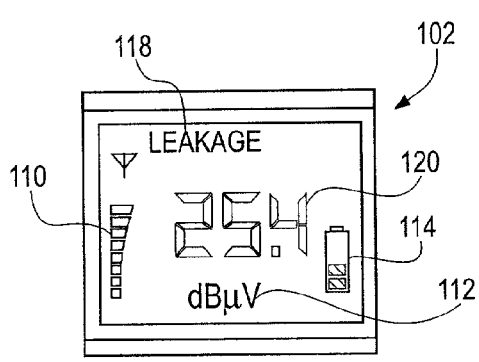
Figure 4D:
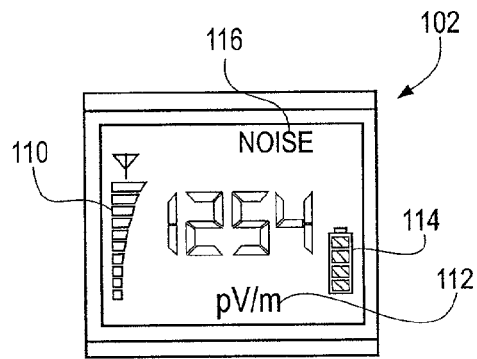
Figure 4E:
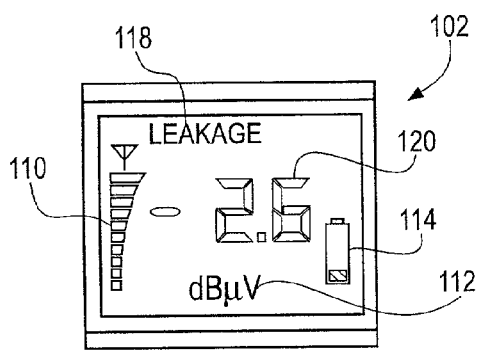

As shown in a step 260, the measured signal level of the center frequency of the carrier is compared against a value of 20 microvolts per meter measured at three meters. This value is the maximum measured signal strength allowable by the FCC. However, any suitable threshold value may be used, for example, 5 to 20 microvolts per meter measured at three meters, or its equivalent. Any measured signal strength above this amount is considered to be unacceptable RF leakage or egress. Of course, the signal strength measured is always proportional to the distance between the point of RF egress and RF receiver. Accordingly, the measured signal level of the center frequency must normalized. One way to normalize the measurement is to set a fixed allowed maximum value, such as 20 microvolts per meter measured at three meters, which requires that the user place the RF receiver (or antenna input) at three meters from the cable or suspected point of RF leakage. This approach is preferable because is simplifies construction and programming of the RF receiver. Alternately, the user could measure the distance between the cable or suspected point of egress and the RF receiver, and input the distance measurement into the RF receiver via keyboard or keypad 64 (FIG. 3). This embodiment, however, is more costly because additional hardware, such as the keyboard or keypad is required. In this case, it is a simple task for the microprocessor 58 (FIG. 3) to normalize or calculate an equivalent signal strength. The LCD display indicates the units of measurement 112, as shown in FIGS. 4A and 4D with respect to noise, and FIGS. 4B, 4C and 4E with respect to leakage measurement. Different units of measurement may be shown depending upon the intended country of use.

In either case, if the measured signal strength 120 (FIGS. 4B, 4C, 4E) of the center frequency of the carrier is greater than 20 microvolts per meter measured at three meters (or its normalized equivalent), as shown in the step 260, a signal leakage or egress condition is declared, as shown in a step 262. Again, any suitable threshold value may be used, as described above. This value represents the maximum measured signal strength for RF leakage or egress permitted under FCC regulations. Declaration of a leakage condition may be done expressly, as shown by the leakage indication on the LCD display, or may be accomplished in a variety of suitable ways, as described above with respect to declaring an interference condition, namely, a visual or audio indication, or other LCD display-based indications. Preferably, no express egress condition need be declared. Rather, the user can determine if an egress condition exists simply by viewing the value of the signal strength of the center frequency of the carrier shown on the display.

The LCD display is periodically updated in real-time, or in such rapid succession so as to appear to the user to be real time. For example, in the illustrated embodiment, the display may be updated with the measured value of the signal strength of the center frequency of the carrier between five and ten times per second. This would permit the user to move about the test environment to check for RF leakage. This would permit the user to move about and determine whether the validated measured signal strength was increasing or decreasing, with the object of the investigation being to identify the location of the egress. As the user approached the source of the egress, the measured signal strength would increase. Conversely, as the user moved away from the source of the egress, the measured signal strength would decrease. Once the user receives a validated signal (i.e., lack of "noise" indication) and discovers the approximate location of the signal egress, the user could move within a predetermined "qualifying" distance from the suspected egress location, for example, three meters, and simply views the display to determine if the signal is of sufficient strength (for example, 20 microvolts per meter measured at three meters) so as to be deemed to be RF leakage or egress.

Note that the measurement of the off-tuned receiver is also repeated continuously, but need not be repeated as rapidly as the measurement of the signal level of the carrier. Because the VCO 66 (FIG. 3) and related circuitry in the RF receiver requires settling time after it is tuned (or off tuned) to a new frequency, a time delay is required between such measurements. Accordingly, the receiver preferably performs one measurement of the off-tuned carrier for every five measurements of the center frequency of the carrier. Of course, any suitable "duty cycle" of measurement may be used. Alternately, a 1:1 duty cycle may be used where each measurement of the signal strength of the carrier frequency is followed (or preceded) by the measurement of the signal strength of the off-tuned carrier frequency.

Still referring to the flowchart of FIG. 5, if the measured signal level of the center frequency of the carrier is less than the maximum allowed value of 20 microvolts per meter measured at three meters or its normalized equivalent, as shown by a "no" branch of the step 260, control then branches back to the step 200 to continuously repeat the test procedure.

Specific embodiments of a system and method for validating and measuring signal leakage according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. A method of validating signals and detecting signal leakage in a cable communications system, the cable communications system providing channel programming on a plurality of RF channels, the method comprising the steps of:
   a) tuning a radio frequency receiver to a desired visual carrier center frequency of a selected RF channel;
   b) measuring a signal level of the carrier center frequency energy;
   c) off-tuning the receiver by a predetermined offset such that an off-tuned carrier frequency, within the same RF television channel allocation but at an alternate to the center carrier frequency location and independent of side band frequency location or coded signal detection, where carrier center freauency and/or side band energy in said channel programming received by said receiver, when off-tuned, should be reduced below carrier center frequency energy in the absence of interference, is selected;
   d) measuring a signal level of the off-tuned carrier frequency energy;
   e) obtaining a signal level difference between the signal level of the carrier center frequency and the signal level of the off-tuned carrier frequency to determine if interference exists;
   f) declaring an interference condition if the signal level difference is less than a predetermined difference amount; and
   g) providing an indication of the signal level of the carrier frequency to permit a determination of whether a signal leakage condition exists without requiring use of a coded signal of said channel programming.

2. The method of claim 1 wherein the steps of measuring are performed by receiving signals corresponding to an existing RE carrier frequency, which signals egress from the cable communications system.

3. The method of claim 1 wherein the steps of measuring are performed passively with no encoding or injecting of test signals into the selected RE channel or modifying the channel programming of the selected channel.

4. The method of claim 1 wherein the steps (a) through (g) are continuously repeated.

5. The method of claim 1 wherein the carrier frequency of the selected RF channel is between 108 MHZ and 400 MHZ.

6. The method of claim 1 wherein the carrier center frequency is within a frequency spectrum designated for use by aircraft communication and aircraft navigation.

7. The method of claim 1 wherein the receiver is off-tuned by between 5 kHz and 100 kHz from a carrier center frequency.

8. The method of claim 1 wherein the receiver is off-tuned by between 100 kHz and 1 MHZ from a carrier center frequency.

9. The method of claim 7 wherein the receiver is off-tuned to a frequency above the carrier center frequency.

10. The method of claim 7 wherein the receiver is off-tuned to a frequency below the carrier center frequency.

11. The method of claim 1 wherein at least one of the measured signal level of the carrier center frequency and the measured signal level of the off-tuned carrier frequency are saved to facilitate obtaining the signal level difference.

12. The method of claim 1 wherein the predetermined difference amount is 3 dB.

13. The method of claim 1 further including the step of validating the carrier center frequency measurement if the signal level difference is not less than the predetermined difference amount.

14. The method of claim 1 wherein if the interference condition has not been declared, declaring a signal leakage condition if the signal level of the carrier frequency is greater than a predetermined leakage amount.

15. The method of claim 1 wherein if the interference condition has not been declared, providing an indication of the signal level of the carrier center frequency so that a signal leakage condition can be determined.

16. The method of claim 15 wherein the indication of the signal level of the carrier center frequency is periodically updated.

17. The method of claim 15 wherein the indication of the signal level of the carrier center frequency is updated in real time.

18. The method of claim 1 further including the step of providing an indication of the signal level of the carrier center frequency so that a signal leakage condition can be determined.

19. The method of claim 1 wherein the signal leakage condition is determined to exist if the measured signal level of the carrier center frequency is greater than the equivalent of 20 microvolts per meter measured at three meters.

20. The method of claim 1 wherein the signal leakage condition is determined to exist if the measured signal level of the carrier center frequency is greater than the equivalent of between 5 to 20 microvolts per meter measured at three meters.

21. The method of claim 1 wherein if the interference condition is detected, an alternate RF channel is chosen having a predetermined RF frequency spacing from the selected channel, and steps (a) through (g) are repeated.

22. A method of validating signals and detecting signal leakage in a cable communications system, the cable communications system providing channel programming on a plurality of RF channels, the method comprising:
   a) tuning a radio frequency receiver to a desired visual carrier center frequency of a selected RF channel;
   b) measuring a signal level of the carrier center center frequency energy;
   c) saving the measured signal level of the carrier frequency in memory;

d) off-tuning the receiver by a predetermined offset such that an off-tuned carrier frequency, within the same RF television channel allocation but at an alternate to the center carrier frequency location and independent of side band frequency location or coded signals in said channel programming, where carrier center frequency energy and/or side band energy in said channel programming received by said receiver, when off-tuned, should be reduced below carrier center frequency energy in the absence of interference, is selected;

e) measuring a signal level of the off-tuned carrier frequency energy;

f) saving the measured signal level of the off-tuned carrier frequency in memory;

g) subtracting the signal level of the off-tuned carrier frequency from the signal level of the carrier center frequency to obtain a signal level difference;

h) declaring an interference condition if the signal level difference is less than a predetermined difference amount; and i) displaying the measured signal level of the carrier center frequency to permit a determination that a signal leakage condition exists.

23. The method of claim 22 wherein the signal leakage condition is determined to exist if the interference condition is not declared and the measured signal level of the carrier center frequency is less than a predetermined leakage amount.

24. A system for validating signals and detecting signal leakage in a cable communications system, the cable communications system providing channel programming on a plurality of RF channels, the system comprising:

a radio frequency receiver;

a computer operatively coupled to the receiver and to a display, the receiver configured to tune to a carrier center frequency of a selected RF channel responsive to the computer, measure a signal level of the carrier center frequency of the selected RF channel, and display the measured signal level on the display;

the computer directing the receiver to off-tune by a predetermined offset such that an off-tuned carrier frequency within the same RF television channel allocation but at an alternate location to the center carrier frequency and independent of side band frequency location where carrier center frequency energy and/or side band energy received by said receiver, when off-tuned, should be reduced, is selected, and measure a signal level of the off-tuned carrier frequency without requiring detection of a coded signal in said channel programming; and wherein the computer calculates a signal level difference between the signal level of the carrier center frequency and the signal level of the off-tuned carrier frequency, and declares an interference condition if the signal level difference is less than a predetermined difference amount.

25. The system of claim 24 wherein the carrier center frequency of the selected RF channel is between 108 MHZ and 400 MHZ.

26. The system of claim 24 wherein the receiver is off-tuned by between 5 kHz and 100 kHz from a carrier center frequency.

27. The system of claim 24 wherein the receiver is off-tuned by between 100 kHz and 1 MHZ from a carrier center frequency.

28. The system of claim 24 wherein the receiver is off-tuned to a frequency above or below the carrier center frequency.

29. The system of claim 24 wherein the predetermined difference amount is 3 dB.

30. The system of claim 24 wherein if the interference condition has not been declared, the computer provides an indication that a signal leakage condition exists if the signal level of the carrier center frequency is greater than a predetermined leakage amount.

31. The system of claim 24 wherein if an interference condition has not been declared, the display provides an indication of the signal level of the carrier center frequency so that a signal leakage condition can be determined.

32. The system of claim 24 wherein the signal level of the carrier center frequency is periodically updated.

33. The system of claim 24 wherein the computer indicates that a signal leakage condition exists if the measured signal level of the carrier frequency is greater than the equivalent of 20 microvolts per meter measured at three meters.

34. The system of claim 24 wherein the computer indicates that a signal leakage condition exists if the measured signal level of the carrier center frequency is greater than the equivalent of between 5 to 20 microvolts per meter measured at three meters.

35. The system of claim 24 wherein the receiver is off-tuned to a frequency above the carrier center frequency.

* * * * *